United States Patent [19]

Schreyer et al.

[11] 4,070,823
[45] Jan. 31, 1978

[54] CHAIN HOOK

[75] Inventors: Kenneth D. Schreyer, Clarence; Soma M. Rohosy, Hartland, both of N.Y.

[73] Assignee: Columbus McKinnon Corporation, Tonawanda, N.Y.

[21] Appl. No.: 702,614

[22] Filed: July 6, 1976

[51] Int. Cl.² .............................................. F16G 17/00
[52] U.S. Cl. ..................................... 59/93; 294/82 R; 24/230.5 R
[58] Field of Search ........................ 59/93; 294/82 R; 24/230.5 CR

[56] References Cited

U.S. PATENT DOCUMENTS

| | | | |
|---|---|---|---|
| 1,758,744 | 5/1930 | Haubert | 294/82 R |
| 3,501,817 | 3/1970 | Bambenek | 294/82 R |
| 3,673,646 | 7/1972 | Svensson | 24/230.5 CR |
| 3,741,599 | 6/1973 | Drayton | 294/82 R |
| 3,795,951 | 3/1974 | Ratcliff | 59/93 |
| 3,863,441 | 2/1975 | Kaufmann | 59/93 |

FOREIGN PATENT DOCUMENTS 2,310,344  9/1973  Germany .......................... 294/82 R Primary Examiner—C.W. Lanham
Assistant Examiner—Gene P. Crosby
Attorney, Agent, or Firm—Bean, Kauffman & Bean

[57] ABSTRACT

A hook of the so-called "grab hook" type for engaging a chain of the welded wire link type, which features improved chain link engagement means. The chain receiving throat of the hook is inclined relative to the load lift line of the hook, and the chain link which is centered in the hook is supported upon a flat saddle portion of the hook which extends beyond opposite sides thereof. The hook receives and carries the chain when under load so as to subject the engaged links of the chain to no severe stress increases.

7 Claims, 5 Drawing Figures

CHAIN HOOK

BACKGROUND AND OBJECTS OF THE INVENTION

Grab hooks have been known for many years, as typified for example by U.S. Pat. Nos. 1,099,068; 1,391,746; 1,758,744; 1,818,813; 3,673,646; 3,741,599 and 3,863,441. However, the object of this invention is to provide an improved hook which is configured to engage a welded wire link type chain in improved manner so as to avoid subjecting the engaged link(s) of the chain to severe load stress increases such as attend use of prior type hooks.

THE DRAWING

The invention is illustrated by the accompanying drawing wherein.

DETAILED DESCRIPTION

Figure 1:
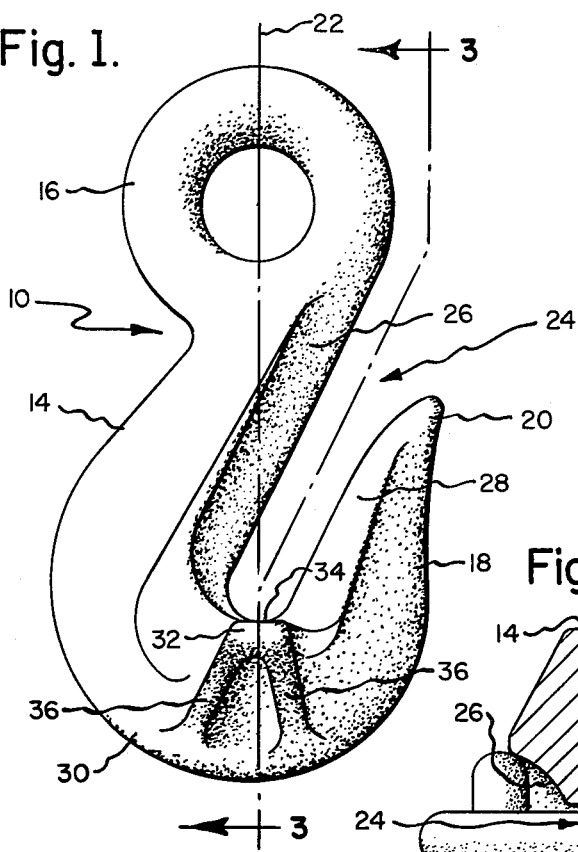
FIG. 1 is a side elevational view of the chain hook of the present invention.
Figure 2:
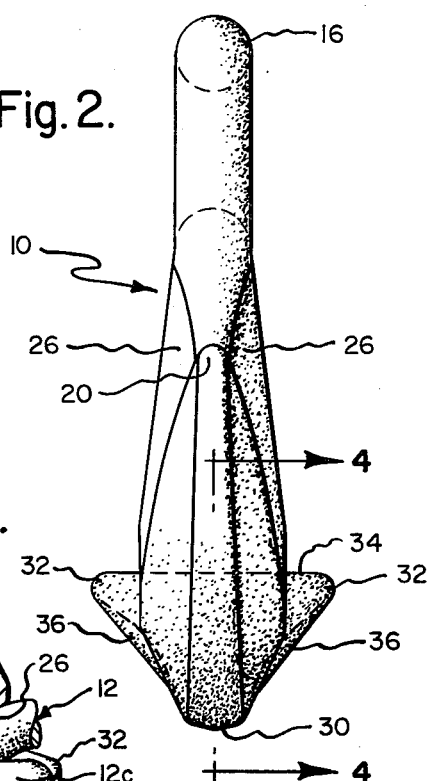
FIG. 2 is a front elevational view thereof.
Figure 5:
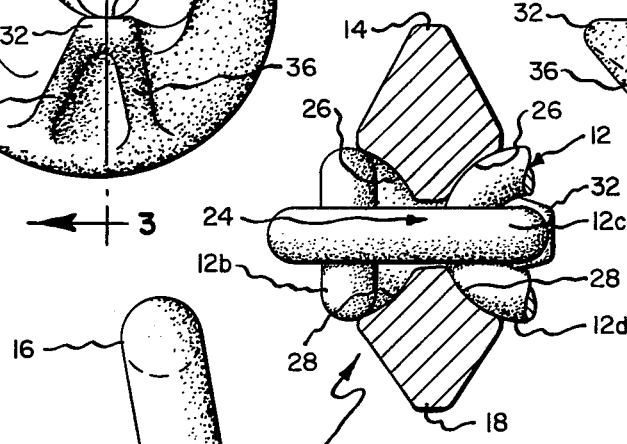
FIG. 5 is a fragmentary section taken as suggested by line 5—5 of FIG. 3.
Figure 3:
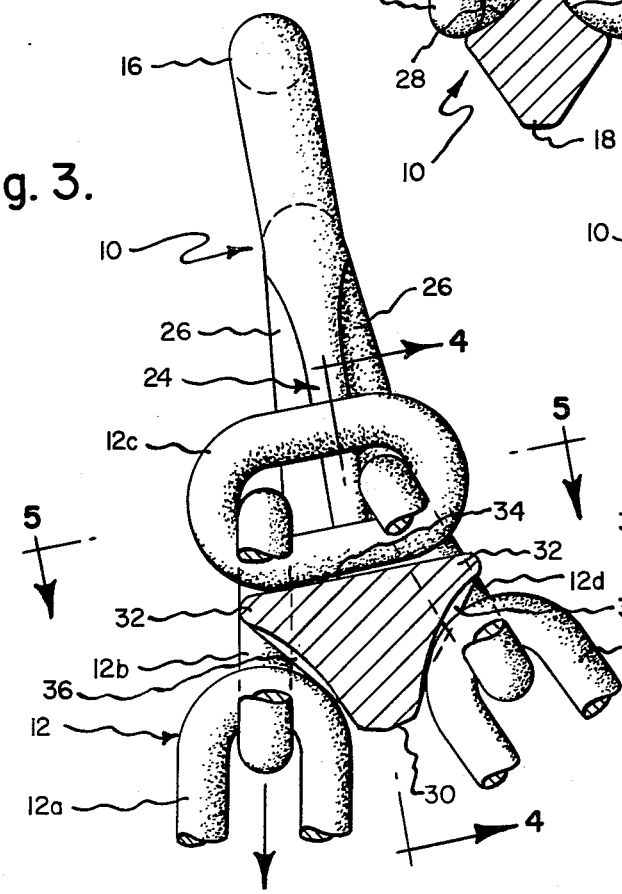
FIG. 3 is a sectional view taken along line 3—3 in FIG. 1; illustrating engagement of a chain therein.

The chain hook of the invention is illustrated generally at 10; and is shown as being engaged with a welded wire link type chain 12 having interconnected links 12a, 12b, 12c, 12d and 12e, as best shown in FIG. 3. The body portion of the hook is generally U-shaped and includes a main leg portion 14 terminating in a conventional type pin or cable connection eye portion 16; while the front leg portion 18 thereof terminates in a pointed portion 20. The two leg portions extend in parallel relation but are substantially inclined relative to the longitudinal axis 22 of the hook (FIG. 1). Thus the leg portions 14, 18, of the hook provide therebetween a forwardly inclined chain receiving throat 24. The opposite faces of the leg portions 14, 18, are concavely beveled along opposite sides of the front view centerline of the hook as illustrated at 26, 26 and 28, 28, respectively; the surfaces 26, 28 being thus sectionally "pocketed" and shaped so as to complement the curvatures of the ends of the chain links when engaged therein as best shown at FIG. 5. Thus, when the chain is engaged in the hook and a load applied through links 12a-12b as illustrated in FIG. 3, one end of the link 12d abuts against hook surfaces 26, 28 to transfer the load to the hook, as illustrated in FIG. 5.

Figure 4:
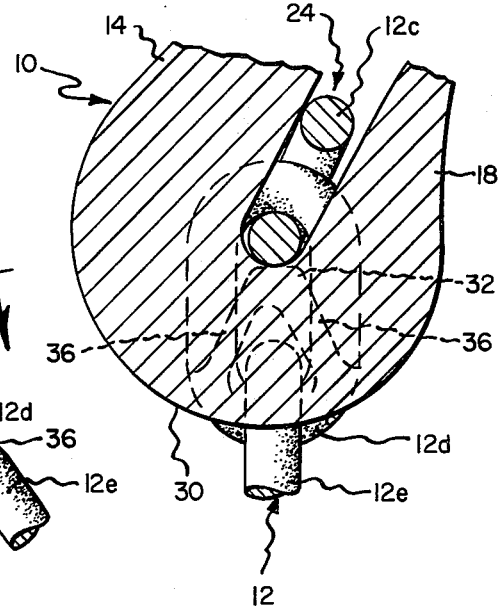
FIG. 4 is a fragmentary sectional view taken along line 4—4 of FIG. 3.

The bight portion 30 of the hook is formed with a pair of flat lugs 32, 32 extending at opposite sides of the hook body at the level of the bottom of the chain receiving throat 24; thereby providing a flat saddle surface 34 for support of the centrally engaged link 12c. As shown at FIG. 3, the hook parts are so dimensioned and configured relative to the links of the chain that when the chain is thus engaged in the hook the centrally engaged link 12c lies generally flatwise on edge and across the saddle surface 34 while being also tilted forwardly in the throat of the hook (as best shown at FIG. 4). Incidental thereto the chain links 12b and 12d at opposite sides of the link 12c hang along opposite sides of the hook and therebelow (FIG. 3); the outer ends of the lug portions 32—32 being shaped to pass through the open centers of the links 12b and 12c to avoid interferences therewith. Also note the hook structures underlying the lugs 32—32 are centrally hollowed to freely accommodate the links 12a-12e therein, while having outstanding reenforcement ribs 36—36 (FIGS. 1, 3) at opposite sides thereof.

As best shown at FIG. 3, when the chain is thus engaged in the hook and a load is applied through links 12a-12b the load is transmitted solely in compression mode against the left hand end bottom leg portion of the chain link 12c which lies in substantially flat support upon the saddle surface 34. As best shown at FIG. 5, when the chain is thus engaged the leading rounded end portion of the slack chain link 12d then abuts in cradled relation against hook surfaces 26, 28, thus preventing the load on the chain from pulling it through the hook. Incidental thereto the forwardly inclined "roof" over the centered link 12c provided by the forwardly sloping surfaces 26—26 operates to maintain the link 12c against rolling towards the left as viewed in FIG. 3 along the left hand end portion of the saddle surface 34. Prior art hooks permit such "rolling" of the engaged link which operates to shift the center of the load connection between the links 12b and 12c further to the left from the position thereof as shown at FIG. 3. In such case the load would have been transformed into bending and shear stresses upon the bottom leg of link 12c instead of being applied as largely compression loads thereon.

The present invention avoids the aforesaid problem, whereby the chain link 12c is protected against severe stress increases such as would induce failures/deformations of the link. Furthermore, the hook of the present invention is of such configuration as to be adapted to be readily manufactured by a lesser number of operations, all of which are standard manufacturing processes. Accordingly, the hook is less expensive to manufacture and is of structurally simple and rugged form.

We claim:

1. A chain hook for use in combination with a chain comprising a series of interlinked bent wire type chain links having straight leg portions intermediately of their end portions, said hook including a main body portion of generally U-shaped configuration when viewed in side elevation, comprising a pair of spaced apart generally upstanding legs joined at their lower ends by an integral bight portion, one of said legs terminating at its upper end in a load connection device, said legs being generally parallel but inclined when viewed in said side elevation and defining therebetween a forwardly inclined throat for receiving in downwardly inclined sliding manner a link of said chain to rest in substantially horizontally sidewise reclining attitude transversely of said bight portion, said legs being bevelled at opposite sides thereof to complement the configurations of the ends of the links engaging said horizontally disposed link, said bight portion including a pair of lugs extending transversely outwardly of said bight portion in opposite directions from said hook body and providing therewith a straight horizontal saddle extending across the lugs for supporting said horizontally disposed link, whereby said saddle provides support to said horizontally disposed link regardless of the length of the link without creating localized stresses which would cause said link to fail prematurely.

2. A chain hook according to claim 1, wherein said saddle is substantially flat.

3. A chain hook according to claim 2, wherein said lugs are formed with base portions sloping upwardly and outwardly from the bottom of said hook bight portion, reinforced by further outstanding web portions.

4. A chain hook according to claim 3, wherein said base portions are centrally recessed and reinforced by outstanding rib portions at opposite sides thereof.

5. A chain hook for use in combination with a chain comprising a series of interlinked bent wire type chain links having straight leg portions intermediately of their rounded end portions, said hook including in side view a generally U-shaped body portion providing a pair of spaced apart generally upstanding legs joined at their lower ends by an integral bight portion, one of said legs terminating at its upper end in a load connection device, said legs being generally parallel but inclined when viewed in side elevation and defining therebetween a forwardly inclined throat for receiving in downwardly inclined sliding manner a link of said chain to rest in substantially horizontally sidewise reclining attitute transversely of said bight portion, said legs being concave bevelled at opposite sides thereof to complement the configurations of the rounded ends of the links engaging said horizontally disposed link, said bight portion including a pair of lugs extending transversely outwardly of said bight portion in opposite directions from said hook body and providing therewith a straight horizontal saddle extending across the lugs for supporting said horizontally disposed link, whereby said saddle provides support to said horizontally disposed link regardless of the length of the link without creating localized stresses which would cause said link to fail prematurely.

6. A chain hook according to claim 5, wherein said lugs are formed with base portions sloping upwardly and outwardly from the bottom of said hook bight portion, reinforced by further outstanding web portions.

7. A chain hook according to claim 6, wherein said base portions are centrally recessed and reinforced by outstanding rib portions at opposite sides thereof.

* * * * *